(12) United States Patent
Liu

(10) Patent No.: US 12,744,803 B2
(45) Date of Patent: Sep. 22, 2026

(54) MULTI-LAYER ANOMALY DETECTOR

(71) Applicant: Microsoft Technology Licensing, LLC, Redmond, WA (US)

(72) Inventor: Zhongkai Liu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/512,867

(22) Filed: Nov. 17, 2023

(65) Prior Publication Data

US 2025/0168181 A1 May 22, 2025

(51) Int. Cl.
*H04L 29/06* (2006.01)
*G06F 21/55* (2013.01)
*G06N 20/20* (2019.01)
*H04L 9/40* (2022.01)

(52) U.S. Cl.
CPC .......... *H04L 63/1425* (2013.01); *G06F 21/55* (2013.01); *G06N 20/20* (2019.01)

(58) Field of Classification Search
CPC ...... H04L 63/1425; G06F 21/55; G06N 20/20
See application file for complete search history.

(56) References Cited

U.S. PATENT DOCUMENTS 11,743,281 B1 * 8/2023 Behl ....................... H04L 41/16 726/22
12,238,119 B1 * 2/2025 Chivu ..................... H04L 41/16
2019/0260793 A1 * 8/2019 Stockdale ............. H04L 63/101
2020/0067969 A1 * 2/2020 Abbaszadeh ............ G06N 5/04
2021/0084059 A1 * 3/2021 Sun ..................... G06F 16/9024
2021/0281592 A1 * 9/2021 Givental ................ G06N 20/10
2023/0124621 A1 * 4/2023 Umesh .................. G06F 21/552 726/23
2024/0364724 A1 * 10/2024 Behl ................... H04L 63/1441

OTHER PUBLICATIONS

"AI Anomaly Detector", Retrieved from: https://azure.microsoft.com/en-us/products/ai-services/ai-anomaly-detector, Retrieved Date: Sep. 25, 2023, 5 Pages.

(Continued)

*Primary Examiner* — Ka Shan Choy
(74) *Attorney, Agent, or Firm* — Weaver IP L.L.C.

(57) ABSTRACT

Multi-layer anomaly detection identifies and issues alerts to focus limited resources on the most concerning activities detected in voluminous data. A multi-layer anomaly detector includes a clusterer, a forecaster, and a statistics generator to respectively generate a first, second, and third anomaly lists for input data indicating voluminous events relative to one or more domains, such as access to computing devices; access to real estate; or financial transactions. An ensemble detector may generate an ensemble anomaly list indicating a subset of the voluminous events based on the first, second, and third anomaly lists. The lists may indicate anomaly (e.g., security risk) scores. The ensemble anomaly list may combine the anomaly (e.g., risk) scores in the first, second, and third anomaly lists. An identifier may generate an alert for the subset of events, e.g., with relative security risk scores for the relevant individuals, entities, and/or events.

20 Claims, 7 Drawing Sheets

(56) References Cited

OTHER PUBLICATIONS

"Azure AI Metrics Advisor", Retrieved from: https://azure.microsoft.com/en-us/products/ai-services/ai-metrics-advisor, Retrieved Date: Sep. 25, 2023, 5 Pages.
"IBM Z Anomaly Analytics", Retrieved from: https://www.ibm.com/products/z-anomaly-analytics, Retrieved Date: Sep. 25, 2023, 4 Pages.
Brooks, Chuck, "Cybersecurity Trends & Statistics for 2023; What You Need to Know", Retrieved from: https://www.forbes.com/sites/chuckbrooks/2023/03/05/cybersecurity-trends--statistics-for-2023-more-treachery-and-risk-ahead-as-attack-surface-and-hacker-capabilities-grow/?sh=5c0cb2e619db, Mar. 5, 2023, 24 Pages.
Gumbao, María Garcia. , "Best clustering algorithms for anomaly detection", Retrieved from: https://towardsdatascience.com/best-clustering-algorithms-for-anomaly-detection-d5b7412537c8, Jun. 3, 2019, 7 Pages.
Shead, Sam, "Amazon hit with $887 million fine by European privacy watchdog", Retrieved from: https://www.cnbc.com/2021/07/30/amazon-hit-with-fine-by-eu-privacy-watchdog-.html, Jul. 30, 2021, 4 Pages.
Swierczewski, et al., "Use the built-in Amazon SageMaker Random Cut Forest algorithm for anomaly detection", Retrieved from: https://aws.amazon.com/blogs/machine-learning/use-the-built-in-amazon-sagemaker-random-cut-forest-algorithm-for-anomaly-detection/, Apr. 25, 2018, 13 Pages.
Wadhwani, Sumeet, "Meta Fined $18.6M Under GDPR for Failing to Protect User Data", Retrieved from: https://www.spiceworks.com/it-security/data-security/news/meta-issued-18-million-gdpr-fine/, Mar. 17, 2022, 10 Pages.
International Search Report and Written Opinion received for PCT Application No. PCT/US2024/052283, mailed on Feb. 6, 2025, 15 pages.
Yin, et al., "Data-Driven Attack Anomaly Detection in Public Transport Networks", 2019 IEEE VTS Asia Pacific Wireless Communications Symposium (APWCS), IEEE, Aug. 28, 2019, pp. 1-5.
International Preliminary Report on Patentability received for PCT Application No. PCT/US2024/052283, mailed on May 28, 2026, 08 pages.

* cited by examiner

200

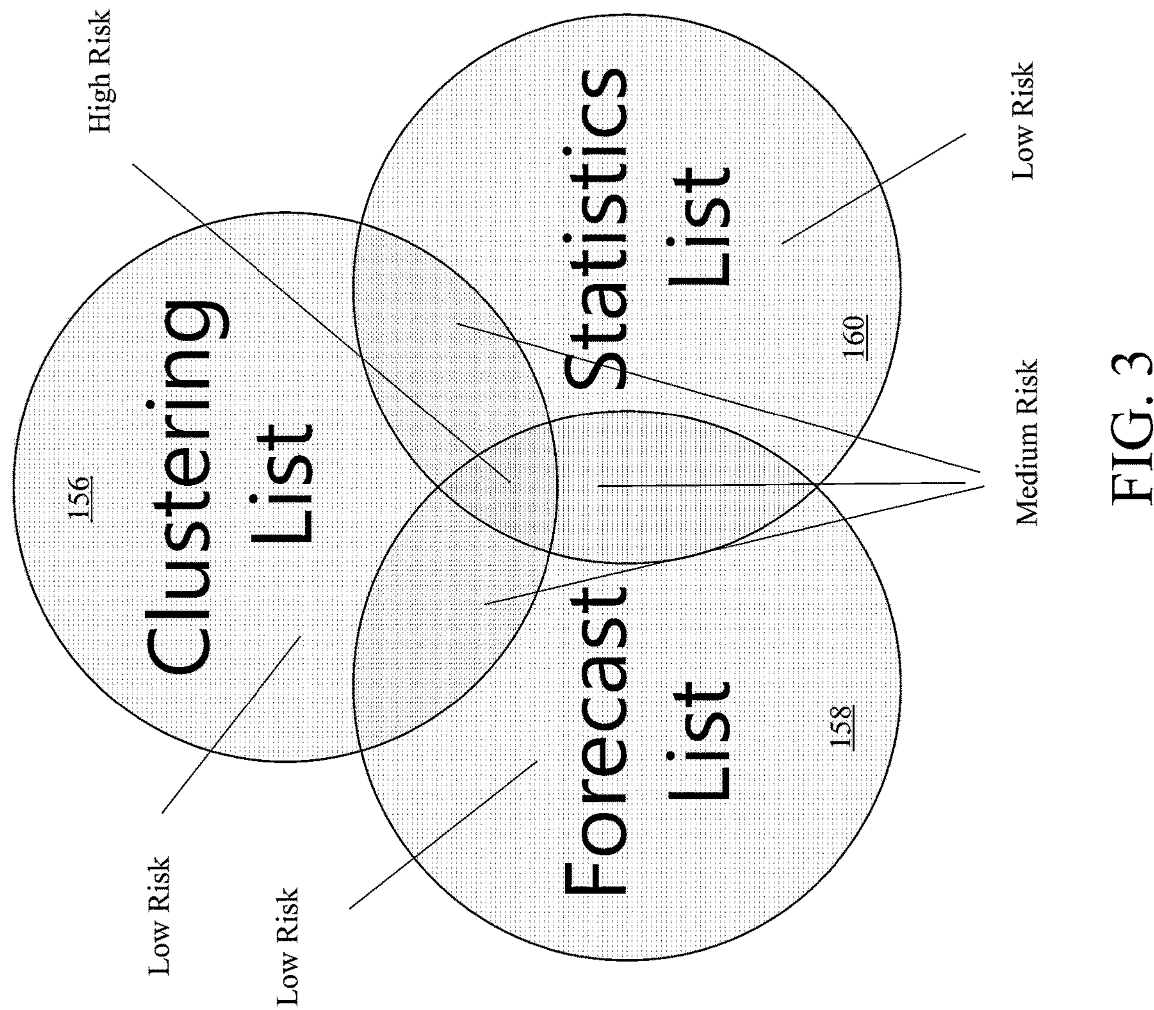
FIG. 3

402

$$Score_{1,i} = Q1 = \frac{n_1}{4}$$

404

$$Score_{2,i} = n_2 - r_{2,i}$$

406

$$Score_{3,i} = n_3 - r_{3,i}$$

408

$$L1_i = \sum_{m=1}^{3} I(acct_i \in list_m)$$

410

$$L2_i = \frac{\sum_{m=1}^{3} Score_{m,i}\, I(acct_i \in list_m)}{\sum_{m=1}^{3} \max_{j=1,\ldots,n_m}(Score_{m,j})}$$

412

$$Risk_i = \begin{cases} High, if\ L1_i = 3 \\ Medium, if\ L1_i = 2 \\ Low, if\ L1_i = 1 \\ Normal, if\ L1_i = 0 \end{cases}$$

FIG. 4B

MULTI-LAYER ANOMALY DETECTOR

BACKGROUND

"Big Data" refers to data sets that are too large or complex to be dealt with manually by humans or traditional data-processing application software. Big data philosophy encompasses unstructured, semi-structured and structured data, with the main focus, however, being on unstructured data. Within big data, the term "size" is a constantly moving target. As of 2012, the term "size" ranged from a few dozen terabytes to many zettabytes of data.

As one example, security monitoring may involve large-scale collection of event logs from systems and services along with threat intelligence from a variety of sources, including commercial services, industry and government sources. Voluminous data may be correlated and analyzed to generate alerts that are provided to security analysts. For example, there may be twenty billion events a day, with significant manual effort to perform complex correlations. Organizations continue to struggle with security breaches, which often result in significant government-imposed fines and loss of customer confidence. Criminals (e.g., hackers) may use artificial intelligence and machine learning for advanced attacks.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Methods, systems and computer program products are provided for multi-layer anomaly detection, which may be used to quickly identify and issue alerts, and overcome the limited automated and/or manpower resources currently being applied to the most concerning activities detected in voluminous data.

In one aspect, a multi-layer anomaly detector system includes a first type anomaly detector (e.g., a clusterer) configured to generate a first anomaly list for input data indicating voluminous events; a second type anomaly detector (e.g., a forecaster) configured to generate a second anomaly list for the input data; a third type anomaly detector (e.g., a statistics generator) configured to generate a third anomaly list for the input data; and an ensemble detector configured to generate an ensemble anomaly list indicating a subset of individuals, entities, and/or events based on the first, second, and third anomaly lists. The first, second, third, and ensemble anomaly lists indicate anomaly (e.g., security risk) scores, with the ensemble anomaly list combining the anomaly scores of the first, second, and third anomaly lists. An identifier may generate an alert for the subset of events indicated by the ensemble anomaly list from the voluminous events indicated by the input data. The alert indicates relative security risk scores for individuals, entities, and/or events.

In a further aspect, the input data indicates behavior of individuals or entities relative to one or more types of activities, such as access to computing devices; access to real estate; or financial transactions.

In still a further aspect, the multi-layer anomaly detector system includes anomaly detection as a service for a plurality of domains. When present, the clusterer may be implemented by a self-organizing map (SOM) neural network model, the forecaster may select a forecasting model from a plurality of forecasting models to generate forecast data for individuals or entities indicated in the input data, and the statistics generator may generate domain-specific statistics, such as statistics indicative of security risk.

Further features and advantages of the subject matter (e.g., examples) disclosed herein, as well as the structure and operation of various embodiments, are described in detail below with reference to the accompanying drawings. It is noted that the present subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a visual example of ensemble anomaly detector logic, according to an example embodiment.

FIG. 4B shows equations for determination of ensemble anomaly list scores, according to example embodiments.

Figure 1:
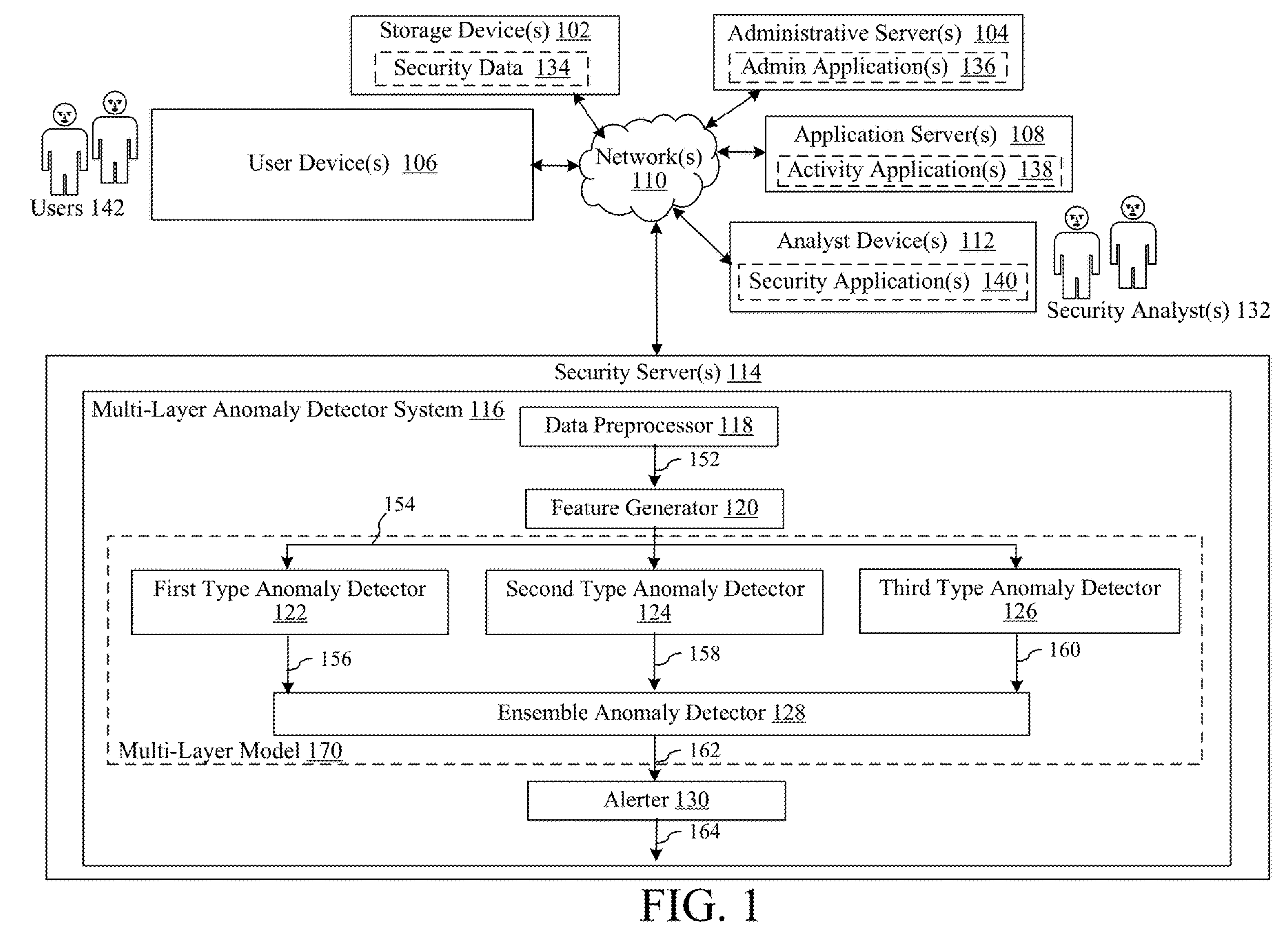
FIG. 1 shows a block diagram of an example of an anomaly detection computing environment, according to an example embodiment.

The features and advantages of the examples disclosed will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

"Big Data," also referred to herein as "voluminous data," refers to data sets that are too large or complex to be dealt with manually by humans or traditional data-processing application software. As an example, security monitoring may involve large-scale collection of event logs from systems and services along with threat intelligence from a variety of sources, including commercial services, industry and government sources. Voluminous data may be correlated and analyzed to generate alerts that are provided to security analysts for detailed investigation and remediation. For example, there may be twenty billion events a day, with significant manual effort used to perform complex correlations. Organizations continue to struggle with security breaches, which often result in significant government-imposed fines and loss of customer confidence. Criminals (e.g., hackers) may use artificial intelligence and machine learning for advanced attacks, necessitating improvements in big data processing, detection, alerts, and remediation using limited resources in terms of time, machines, and manpower.

A small percentage of security events or incident cases may be scrutinized due to the vast numbers collected. Scrutinization of a percentage of the security events may involve manual review. Some events may involve complex correlations. Some automated solutions may be deployed across the stack, but the solutions may be unable to identify and/or resolve multiple or all aspects of a complex security compromise. Analysts may be called upon to sift through high volumes of false positives to detect real anomalous behavior. When true positives are found, critical contextual information may be collected from other systems to validate the security problem and remediate it.

The annual cost of cybercrime is trillions of dollars. As the "Metaverse" (an iteration of the Internet as a universal and immersive virtual world) comes more online it will serve as a new vector for exploitation. Consequently, an intelligent, reliable, and efficient cybersecurity detection system is of utmost importance to monitor potentially compromised accounts in a wide variety of domains to avoid significant financial losses.

Embodiments disclosed herein are configured to detect anomalies in large amounts of collected data and raise such anomalies to attention for handling. In embodiments, user and entity behavioral analytics are monitored and analyzed in a security event detection layer. Capturing identity telemetry from on-premises and cloud identity sources and using customized machine learning techniques may support identification of unusual behaviors and relevant investigations. The convergence of high-context sources and low-context sources supports recognition of compound anomalies and clear visibility across operating environments. High context sources in the computer network access domain may include, for example, Microsoft Azure Active Directory Identity Protection (AADIP), Advanced Threat Protection (ATA), Windows Defender Advanced Threat Protection (WDATP), and Microsoft Cloud App Security (MCAS). Low-context sources in the computer network access domain may include, for example, Microsoft Windows Events.

In an embodiment, an end-to-end domain-customizable machine learning (ML) security system is implemented as an AI (artificial intelligence) algorithm that detects anomalous events (e.g., anomalous network login events in the computer network access domain). Domain knowledge (e.g., provided by domain security analysts) may be incorporated into feature engineering to expand the signal table. Such a multi-layer ensemble AI model may be trained with tunable (e.g., fine-tuned) optimal parameters in the algorithm, e.g., on top of the derived signals. A comprehensive feedback loop may be implemented to reinforce model performance.

Such a security system is directed to addressing the challenges of big data, unlabled data, and limiting the number of alerts to avoid overwhelming limited resources. In an example of big data in a computer network access domain, a security system may handle 400,000 accounts with 300 million logon events generating 4.5 TB of data on a daily basis. The security system may connect a diversified set of data feeds across devices, system logs, human resources (HR), virtual private networks (VPNs), logon telemetry, etc.

In one example, data may be unlabeled data. There may not be any labeled anomalous accounts of record. The security system model may learn historical and present user behaviors from different channels, cross compare different account users with similar demographic information, summarize the trends, and identify potential anomalies in a systematic way.

In conventional systems, a limited number of alerts may be generated, for example, due to resource constraints. Security analysts may not have bandwidth to validate a large number of alerts daily. Embodiments of a security system model may reduce the noise to signal ratio, for example, by identifying and surfacing a subset of the riskiest events to case management for investigation (e.g., 20 events/day).

The security system may be implemented as an anomaly detection system as a service for a variety of domains (e.g., computer network access, real estate access, financial transactions).

Anomaly detection may precede anomaly validation, which determines true and false positives. Accuracy in detection and/or validation of anomalies, which may indicate portions of security threats, may be improved by learning from user and entity behaviors.

The efficient and intelligent anomaly detection solution is applicable to entities, such as corporate entities, for multiple reasons to protect and/or improve operations, assets, and reputation in multiple ways, e.g., relative to security and fraud prevention, operational efficiency, cost reduction, quality control, customer experience, regulatory compliance, predictive maintenance, supply chain management, early warning system, reputation management, financial fraud detection, healthcare and pharmaceuticals, etc.

Such embodiments for anomaly detection enable security and fraud prevention. An anomaly detection algorithm can identify unusual patterns or behaviors in security data, such as account login events, which may be useful for detecting compromised accounts, fraudulent activities, cyberattacks, and security breaches in the cyber kill chain. Companies can proactively respond to these anomalies to prevent financial losses and data breaches.

Embodiments for anomaly detection support operational efficiency. Anomalies in operational data can signal equipment failures, process deviations, and/or supply chain disruptions. Early detection allows companies to take corrective actions, which may reduce downtime, maintenance costs, and/or production losses. An anomaly detector may handle big, unlabeled, and sparse operational data in data platforms.

Embodiments for anomaly detection enable cost reduction. An anomaly detection model can optimize resource allocation and identify cost-saving opportunities. By spotting irregularities in financial or operational data, companies can eliminate inefficiencies, reduce waste, and/or improve resource allocation.

Embodiments for anomaly detection support quality control. Anomalies in production or product quality data can indicate defects or deviations from desired standards. Detecting these anomalies through a an anomaly detection engine may help companies maintain product quality and customer satisfaction.

Embodiments for anomaly detection support customer experience. Anomalies in customer data can point to unusual behaviors or complaints, which may enable companies to address issues promptly and enhance customer experience. Anomaly detection may be applied to a customer data platform to detect anomalies and improve data security.

Embodiments for anomaly detection support regulatory compliance. Many industries are subject to regulatory requirements. Anomaly detection can help companies stay compliant. By identifying deviations from regulatory norms, companies can take corrective actions and avoid fines or legal consequences.

Embodiments for anomaly detection enable predictive maintenance. Anomaly detection may be used for predictive maintenance in industries such as manufacturing, energy, and transportation. Anomaly detection may help companies anticipate equipment failures and schedule maintenance before critical issues arise.

Embodiments for anomaly detection support supply chain management. Anomalies in supply chain data can signal disruptions, delays, or shortages. Companies can use anomaly detection to optimize their supply chain operations and ensure timely deliveries.

Embodiments for anomaly detection provide an early warning system. Anomaly detection may serve as an early warning system for various issues, such as market fluctuations, customer churn, and inventory imbalances. Companies can proactively respond to these anomalies to minimize negative impacts.

Embodiments for anomaly detection support reputation management. Detecting anomalies related to customer sentiment, social media chatter, or online reviews may allow companies to address public relations issues promptly and protect brand reputation.

Embodiments for anomaly detection provide for financial fraud detection. Finance organizations may rely on anomaly detection to identify unusual transactions, potentially indicating fraudulent activities, such as credit card fraud or money laundering. Anomaly detection may be implemented in the fraud detection domain, e.g., considering high fidelity performance and architecture for big unlabeled data sets.

Embodiments for anomaly detection support healthcare and pharmaceutical companies. Anomaly detection may be useful in healthcare for monitoring patient health data and detecting unusual medical conditions or disease outbreaks. In the pharmaceutical industry, anomaly detection may help identify anomalies in drug manufacturing and clinical trial data.

Anomaly detection may provide significant assistance to companies to enhance cyber security, reduce costs, improve operational efficiency, maintain quality, and/or make data-driven decisions. By identifying outliers and irregularities in data, companies can mitigate risks, seize opportunities, and maintain competitive edge in a data-driven business landscape. Anomaly detection may be implemented as a reusable ML service that may be integrated into other products.

Embodiments that enable the above features, and further features, are described in further detail in the following section.

II. Example Implementations

Methods, systems and computer program products are provided for multi-layer anomaly detection. Multi-layer anomaly detection quickly identifies and issues alerts that enable limited automated and/or manpower resources to be focused on the most concerning activities detected in voluminous data. A multi-layer anomaly detector includes a first type anomaly detector (e.g., a clusterer) configured to generate a first anomaly list for input data indicating voluminous events, a second type anomaly detector (e.g., a forecaster) configured to generate a second anomaly list for the input data, a third type anomaly detector (e.g., a statistics generator) configured to generate a third anomaly list for the input data, and an ensemble detector configured to generate an ensemble anomaly list indicating a subset of events based on the first, second, and third anomaly lists.

The first, second, third, and ensemble anomaly lists indicate anomaly (e.g., security risk) scores. The ensemble anomaly list is a combination of the anomaly scores of the first, second, and third anomaly lists. An identifier generates an alert for the subset of events indicated by the ensemble anomaly list from the voluminous events indicated by the input data. The alert(s) may indicate relative security risk scores for individuals, entities, and/or events. The input data may indicate behavior of individuals or entities relative to one or more types of activities, such as access to computing devices, access to real estate, or financial transactions. The multi-layer anomaly detector system includes an anomaly detection as a service for a plurality of domains. A clusterer may be implemented by a self-organizing map (SOM) neural network model. A forecaster may select a forecasting model from a plurality of forecasting models to generate forecast data for individuals or entities indicated in the input data. A statistics generator may generate domain-specific statistics, e.g., indicative of security risk.

In embodiments, an anomaly detector may be implemented in various configurations. For instance, FIG. 1 shows a block diagram of an example of an anomaly detection computing environment 100, according to an example embodiment. For example, Big Data may be analyzed in environment 100 to determine anomalies and select a subset of events, individuals, and/or entities for detailed review and actions to eliminate security risks. Anomaly detection computing environment 100 includes one or more user devices 106, one or more networks 110, one or more administrative servers 104, one or more application servers 108, one or more analyst device 112, and one or more security servers 114. Security server(s) 114 includes a multi-layer anomaly detector system 116 that includes a data preprocessor 118, a feature generator 120, a first type anomaly detector 122, a second type anomaly detector 124, a third type anomaly detector 126, an ensemble anomaly detector 128, and an alerter 130.

Example anomaly detection computing environment 100 presents one of many possible examples of computing environments in which embodiments may be implemented. Example anomaly detection computing environment 100 includes any number of computing devices and/or servers, such as example components illustrated in FIG. 1 and other additional or alternative devices not expressly illustrated. The components of environment 100 are described in further detail as follows.

Network(s) 110 includes one or more of any of a local area network (LAN), a wide area network (WAN), a personal area network (PAN), a combination of communication networks, such as the Internet, and/or a virtual network. In example implementations, user device(s) 106, network(s) 110, administrative server(s) 104, application server(s) 108, analyst device(s) 112, and security server(s) 114 may be communicatively coupled via network(s) 110. In an implementation, any one or more of user device(s) 106, network(s) 110, administrative server(s) 104, application server(s) 108, analyst device(s) 112, and security server(s) 114 may communicate via one or more application programming interfaces (APIs), and/or according to other interfaces and/or techniques. User device(s) 106, network(s) 110, administrative server(s) 104, application server(s) 108, analyst device(s) 112, and security server(s) 114 may include one or more network interfaces that enable communications between devices. Examples of such a network interface, wired or wireless, may include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

User device(s) 106 includes computing devices utilized by one or more users (e.g., individual users, family users, enterprise users, governmental users, administrators, hackers, etc.) generally referenced as users 142. User device(s) 106 includes one or more applications, operating systems, virtual machines (VMs), storage devices, etc., that may be executed, hosted, and/or stored therein or via one or more other computing devices via network(s) 110. In an example, user device(s) 106 may access one or more server devices, such as administrative server(s) 104 and application server(s) 108, to provide information, request one or more services (e.g., content, model(s), model training) and/or receive one or more results (e.g., trained model(s)). User device(s) 106 may represent any number of computing devices and any number and type of groups (e.g., various users among multiple cloud service tenants). Users 142 may represent any number of persons authorized to access one or more computing resources. User device(s) 106 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. User device(s) 106 are not limited to physical machines, but may include other types of machines or nodes, such as a virtual machine, that are executed in physical machines. User device(s) 106 may each interface with administrative server(s) 104 and application server(s) 108, for example, through APIs and/or by other mechanisms. Any number of program interfaces may coexist on user device(s) 106. An example computing device with example features is presented in FIG. 6.

User device(s) 106 may have respective computing environments. User device(s) 106 may execute one or more processes in their respective computing environments. A process is any type of executable (e.g., binary, program, application) that is being executed by a computing device. A computing environment may be any computing environment (e.g., any combination of hardware, software, and firmware). For example, user device(s) 106 may execute a browser application, which may execute code (e.g., using a JavaScript engine) to display user interfaces (e.g., graphical user interfaces (GUIs)) that users 142 interact with for one or more Web-based applications executed by administrative server(s) 104 and/or application server(s) 108. For example, a GUI displayed by a browser may request computer network login credentials to determine whether a user of users 142 can access a company's network. A browser application may be configured to communicate (e.g., via network(s) 110) with one or more applications executed by administrative server(s) 104 and/or application server(s) 108, such as admin application(s) 136 and/or activity application(s) 138 (e.g., computer network applications, real estate access card readers, financial/banking applications).

Administrative server(s) 104 includes one or more computing devices, servers, services, local processes, remote machines, web services, etc. for executing admin application(s) 136. In an example, administrative server(s) 104 includes a server located on an organization's premises and/or coupled to an organization's local network, a remotely located server, a cloud-based server (e.g., one or more servers in a distributed manner), or any other device or service that may host, manage, and/or provide resource(s) for execution of admin application(s) 136. Administrative server(s) 104 may be implemented as a plurality of programs executed by one or more computing devices. In examples, admin application(s) 136 may include network access interfaces, human resources (HR) interfaces, etc.

Application server(s) 108 includes one or more computing devices, servers, services, local processes, remote machines, web services, etc. for executing activity application(s) 138. In an example, application server(s) 108 includes a server located on an organization's premises and/or coupled to an organization's local network, a remotely located server, a cloud-based server (e.g., one or more servers in a distributed manner), or any other device or service that may host, manage, and/or provide resource(s) for execution of activity application(s) 138. Application server(s) 108 may be implemented as a plurality of programs executed by one or more computing devices. In examples, activity application(s) 138 may include computer network applications (e.g., word processing, job processing), real estate access card readers, financial/banking applications, etc.

In an example, administrative server(s) 104 and application server(s) 108 may be part of an exabyte-scale big data platform with hundreds of thousands of machines operating in multiple data centers worldwide. A runtime server system may use a resource manager, for example to manage hundreds of thousands or millions of system processes per day from tens of thousands of users. A runtime server system may manage efficiency, security, scalability and reliability, utilization, balancing, failures, etc. For example, administrative server(s) 104 and application server(s) 108 may be operated by a cloud provider with hundreds of thousands of clients, which may be individuals, enterprises with few to many (e.g., thousands) of employees and contractors, etc.

Storage device(s) 102 includes one or more storage devices. Storage device(s) 102 may store data and/or programs (e.g. information). Data may be stored in storage device(s) 102 in any format. Storage device(s) 102 may represent an accumulation of storage in multiple servers. Storage device(s) 102 may store a wide variety of data, including security data 134, comprising data that may be utilized by security server(s) 114, multi-layer anomaly detector system 116, security application(s) 140, etc., to identify security issues. Security data 134 may include current data, historical data, administrative (e.g., HR) data, and so on.

Security server(s) 114 may execute security programs, such as multi-layer anomaly detector system 116, to detect potential security issues and generate alerts that may be automatically and/or manually investigated. Confirmed security issues may be resolved via one or more actions (e.g., by applying one or more remedies, such as additional monitoring, blocking user access, contacting authorities, apprehending users and/or devices, and so on).

Data preprocessor 118 performs data preprocessing of security data 134. Security data 134 includes any type of data useful to provide insight about monitored events. Security data 134 may be encompass one or more domains, such as computer network access events, operating system login events, real estate (e.g., building) access events, information about known and unknown devices, authorized and unauthorized devices, account management, user personal information, device models and configuration, account system logs, VPN logon, HR information, etc. Voluminous data may incur a great deal of noise. Preprocessing data may be domain-specific. Data preprocessor 118 may represent a combination of components/functions, such as, for example, a data filter/selector, data loader/extractor, data preprocessor (e.g., data transformer, data normalizer), etc. Preprocessing may filter out data that may not be used by one or more event risk detection models. Filtering logic may screen out "noisy" information from the data pool to create an in-scope (e.g., relevant) data set for further analysis. Data preprocessor 118 generates preprocessed security data 152. Preprocessed security data 152 may be provided to feature generator 120.

Feature generator 120 performs feature engineering on preprocessed security data 152 to generate a signal table 154, which may include user-based signals (e.g., demographic/personal information) and/or behavior-based signals (e.g., past activity/usage versus present activity/usage pattern per user). Feature generator 120 may include, for example, a feature extractor, a feature preprocessor (e.g., feature vectorizer), etc. A signal table 154 may capture multiple dimensions to cross compare different users in multiple dimensions (e.g., horizontally as well as vertically) to identify anomalies in real time. Data sources may be joined by primary keys. A signal table 154 may reflect user signals and behavior signals, which may be refined by domain security experts. The signal table 154 may be provided to the multi-layer anomaly detection model (e.g., first, second, and third type anomaly detectors 122, 124, 126) to build a correlation structure and identify anomalies from voluminous users and voluminous events indicated by the signal table 154.

Multi-layer model 170 may utilize information from the signal table 154 to cross compare different users via user-based signals and/or the present status of a user to a past behavior pattern for the user. Multiple dimensions may be captured through multiple layers of multi-layer model 170. Each layer may capture at least one perspective in terms of anomalies. The aggregated result may represent a shortlist or subset of events or users (e.g., at most 20 per day) from among the full set of events or users (e.g., 400,000 users and millions of events per day).

Multi-layer model 170 may include first, second, and third types of anomaly detectors 122, 124, 126 and ensemble anomaly detector 128. The first type anomaly detector 122 represents a first layer (Layer I). The second type anomaly detector 124 represents a second layer (Layer II). The third type anomaly detector 126 represents a third layer (Layer III). Ensemble anomaly detector 122 represents an aggregation layer (Layer IV).

Figure 2:
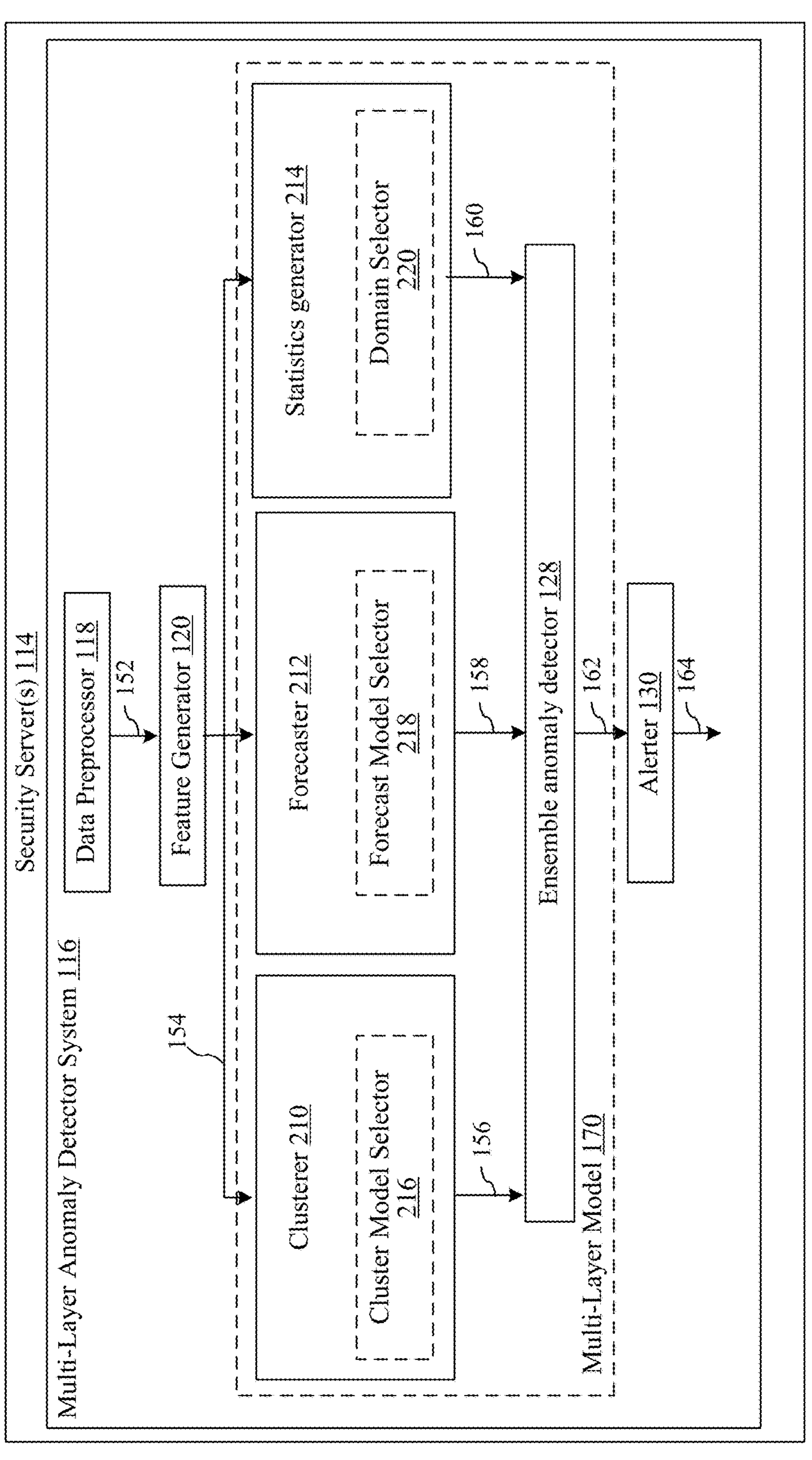
FIG. 2 shows an example of a multi-layer anomaly detector system, according to an example embodiment.

Different types of anomaly detection may include, for example, clustering, forecasting, and statistics. FIG. 2 shows an example of a multi-layer anomaly detector, according to an example embodiment. As shown in FIG. 2, multi-layer model 170 in multi-layer anomaly detector system 116 includes a clusterer anomaly detector ("clusterer") 210 as an example of first type anomaly detector 122 of FIG. 1, a forecaster anomaly detector ("forecaster") 212 as an example of second type anomaly detector 124 of FIG. 1, a statistics anomaly detector ("statistics generator") 214 as an example of third type anomaly detector 126 of FIG. 1, and ensemble anomaly detector 128. Clusterer 210 includes a cluster model selector 216, forecaster 212 includes a forecast model selector 218, and statistics generator 214 includes a domain selector 220. Other types or combinations of anomaly detection may be implemented in other examples. The components of FIG. 2 are further described as follows.

First type anomaly detector 122 (e.g., clusterer 210) may be implemented, for example, as an unsupervised clustering learning model trained to identify a minority group from a majority group in terms of user-based features in signal table 154, such as user demographic information, tenure, persona, workstation type, etc. Clustering methods implemented by clusterer 210 may include, for example, self-organizing feature map (SOM), K-means, and Gaussian Mixture Model (GMM). Clusterer 210 may include an automatic model selector. For example, as shown in FIG. 2, clusterer 210 includes cluster model selector 216 configured to select a cluster model from multiple types of clustering models, e.g., SOM, K-means, GMM. Using the selected cluster model, and based on signal table 154, clusterer 210 generates a minority group of events or users as an output, which may be referred to as a first anomaly list (e.g., clustering anomaly list) 156. The number of events or users (e.g., user accounts) indicated as a minority group in the first/clustering anomaly list 156 may vary. A visualization of the first/clustering anomaly list 156 may be generated, for example, by security application(s) 140 for review by security analyst(s) 132. First/clustering anomaly list 156 may be provided to ensemble anomaly detector 128.

Second type anomaly detector 124 (e.g., forecaster 212) may be implemented, for example, as a forecasting model where one or more forecasts/predictions based on historical information may be compared to one or more actual types of information to identify anomalies. For example, in a network or OS access domain, anomalies may be detected in the actual versus predicted count of daily non-domain joined devices, which may refer to computing devices that are not connected to an enterprise/company domain. Non-domain devices may include, for example, a personal laptop, a temporary contractor's computer, a mobile phone, and so on. An individual may have several non-domain joined devices used to access a company network. A variation in non-domain joined devices may, alone or combined with other information, indicate anomalous behavior in a user behavior pattern over a time period. Forecaster 212 may include an automatic model selector. For example, as shown in FIG. 2, forecaster 212 includes forecast model selector 218 configured to select a forecasting model from multiple types of forecasting models, which may include a set of ML algorithms, such as linear regression, Support Vector Machines, Gradient Boosting, K Nearest Neighbors, Decision Tree, Random Forest, XGBoost, and Neural Network. Model selection may be based on model accuracy, for example, for a given signal table 154. The selected model may vary (e.g., day by day), for example, depending on the relative accuracy of the models. The most accurate model may be selected to predict for each user a count of daily non-domain joined devices in the most recent day. Based on the selected forecasting model and signal table 154, forecaster 212) is configured to generate a list of events or users as an output, which may be referred to as a second anomaly list (e.g., forecast anomaly list) 158. Second/forecast anomaly list 158 may be provided to ensemble anomaly detector 128.

Third type anomaly detector 126 (e.g., statistics generator 214) may be implemented, for example, as a statistical detector for domain-specific information in signal table 154. First and/or second types of anomaly detectors 122, 124 (e.g., clustering and forecasting layers 210, 212) may be based on ML/AI. Third type anomaly detector 126 (e.g., statistics generator 214) may implement a domain-specific perspective as a layer based on statistical inference. ML training may treat signals equally, even though some signals may be more important than others in detecting anomalies. Third type anomaly detector 126 (e.g., statistics generator 214) may include an automatic domain selector, which may be used to process domain-specific signal data. For example, as shown in FIG. 2, statistics generator 214 may include domain selector 220 configured to select a domain from multiple types of domains, such as computer network or operating system access, real estate access, financial transactions, etc. For example, in the network access domain, a particular type of non-domain joined devices, such as generally-fixed location desktops, used by a user may be deemed important in determining potential security issues. For example, signal table 154 may include a count of non-domain joined (NDJ) new unique workstations, a count of total new unique workstations, the new NDJ ratio, and the count of NDJ unique desktops. Based on the selected domain and signal table 154, statistics generator 214 is configured to determine user accounts with the largest values across these signals as an indication of potential security risks. Statistics generator 214 may generate a list of users with the highest statistical anomalies as an output, which may be referred to as a third anomaly list (e.g., statistics anomaly list) 160. Third/statistics anomaly list 160 may be provided to ensemble anomaly detector 128.

Ensemble anomaly detector 128 receives first/clustering anomaly list 156, second/forecast anomaly list 158, and third/statistics anomaly list 160. Ensemble anomaly detector 128 is configured to aggregate lists generated by other layers. For example, the first/clustering layer may identify a minority group from a majority group of users in terms of user-based information, the second/forecasting layer may focus on user behavior to detect anomalous behavior by comparing each user's past behavior pattern to the user's present behavior pattern, and the third/statistics layer may use domain-specific detection logic to identify anomalies. Ensemble anomaly detector 128 may be implemented by a model combining results from other layers, resulting in a final list, e.g., ensemble anomaly list 162.

Ensemble anomaly list 162 may be based on a majority across the first, second, and third anomaly lists 156, 158, 160. For instance, ensemble anomaly list 162 may be generated by ensemble anomaly detector 128 to include anomalies that occur the most often across anomaly lists 156, 158, and 160, may include the anomalies of the combination of anomaly lists 156, 158, and 160 with the highest risk scores (e.g., a predetermined number of anomalies with the highest scores, the anomalies having risk scores above a predetermined threshold risk score value, etc.), and/or other sets of anomalies determined by majority vote or otherwise.

Multi-layer model 170 is configured to process big data connecting various data sources and signals, unlabeled data with limited time retention of historical logs related to malicious activities, sparse data with occasionally observed feature values in a time span, generating a shortlist of alerts to reduce the noise to signal ratio by providing the riskiest events to case management for investigation. Multi-layer model 170 may be applied as a service applicable to multiple domains, such as anomalous logins, cybersecurity, operations, incident management, cost optimization, real estate access, financial transactions, etc.

Alerter 130 receives ensemble anomaly list 162. Alerter 130 is configured to generate one or more alerts 164 for a subset of events indicated by ensemble anomaly list 162 from voluminous events indicated by security data 134. Alerts 164 may be provided to or accessed by analyst device(s) 112. Alerts 164 may be presented to security analyst(s) 132 using security application(s) 140. Alerter 130 may, e.g., additionally and/or alternatively, provide alerts 164 to other devices and applications, such as security server(s) 114, for automated analyses, information gathering, etc. Alerts 164 may be transmitted and consumed in any suitable form, such as emails, text messages, user screen notifications, etc.

Analyst device(s) 112 is configured to execute security application(s) 140, which may present alerts 164 and/or other security information, e.g., in a GUI, to security analyst(s) 132. Analyst device(s) 112 includes computing devices utilized by one or more security analyst(s) 132. Analyst device(s) 112 includes one or more applications, operating systems, virtual machines (VMs), storage devices, etc., that may be executed, hosted, and/or stored therein or via one or more other computing devices via network(s) 110. Analyst device(s) 112 may represent any number of computing devices and any number and type of groups. Security analyst(s) 132 may represent any number of persons authorized to access analyst device(s) 112. Analyst device(s) 112 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Analyst device(s) 112 are not limited to physical machines, but may include other types of machines or nodes, such as a virtual machine, that are executed in physical machines. An example of analyst device(s) 112 with example features is presented in FIG. 6.

FIG. 3 shows a visual example of ensemble anomaly detector logic, according to an example embodiment. FIG. 3 shows an example of a Venn diagram depicting overlapping risk assessments for individuals, entities, events, etc. generated by multiple anomaly detection layers, e.g., as described by examples in FIGS. 1 and 2. The risk assessments may be generated, for example, in the form of anomaly lists, e.g., clustering list 156, forecast list 158, and statistics list 160. As shown in FIG. 3, ensemble aggregation logic may designate non-overlapping risk assessments (e.g., risk assessments that are in only one list) as low risk, risk assessments that appear in two lists as medium risk and risk assessments that appear in three lists as high risk. Ensemble anomaly list 162 may indicate the respective risks (e.g., low, medium, high) determined by ensemble anomaly detector 128. Alerter 130 may indicate the respective risks (e.g., low, medium, high) in alerts 164, which may be utilized for manual and/or automated actions, such as detailed analyses, designation as true or false positives, correlation with other security information, etc.

Figure 4A:
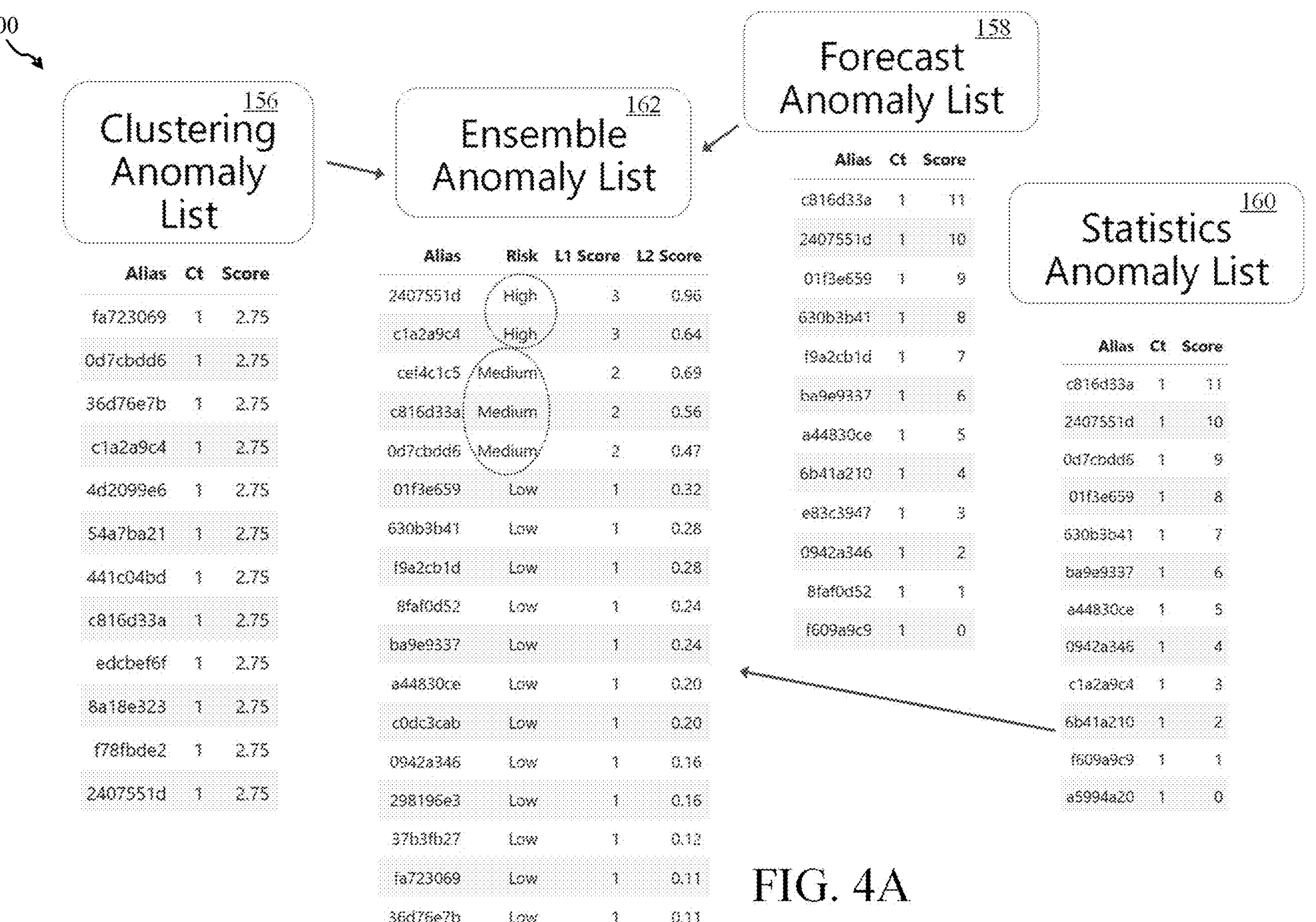
FIG. 4A shows an example of risk scores in anomaly lists, according to an example embodiment.

FIG. 4A shows an example of risk scores in anomaly lists, according to an example embodiment. Clustering anomaly list 156 shows twelve users with the highest cluster anomaly scores. Forecasting anomaly list 158 shows twelve users with the highest forecasting anomaly scores. Statistics anomaly list 160 shows twelve users with the highest statistical anomaly scores. Ensemble anomaly list 162 combines or aggregates the clustering anomaly list 156, the forecasting anomaly list 158, and the statistics anomaly list 160 using combination logic. In some examples, e.g., as shown in FIG. 4A, ensemble anomaly list 162 lists all users (e.g., 17 users) appearing on any of the clustering anomaly list 156, the forecasting anomaly list 158, and/or the statistics anomaly list 160.

An example of ensemble combination logic is described herein, but logic may vary among implementations. In an example, for each user or user account i on the clustering anomaly list 156, the forecasting anomaly list 158, and the statistics anomaly list 160 and/or on ensemble anomaly list 162, ensemble anomaly list scores $L1_i$ and $L2_i$ and risks $Risk_i$ may be determined in accordance with Equations 402-412 shown in FIG. 4B.

With reference to Equations 402-412, $score_{1,i}$ is the score of the ith account on clustering anomaly list 156; $score_{2,i}$ is the score of the ith account on forecasting anomaly list 158; $score_{3,i}$ is the score of the ith account on statistics anomaly list 160; $n_1$ is the number of users (e.g., user accounts) on clustering anomaly list 156; $n_2$ is the number of users (e.g., user accounts) on forecasting anomaly list 158; $n_3$ is the number of users (e.g., user accounts) on statistics anomaly list 160; $r_{2,i}$ is the rank of the ith account on forecasting anomaly list 158; $r_{3,i}$ is the rank of the ith account on statistics anomaly list 160; $acct_i \in list_m$ is an indicator function that returns one (1) if the ith user belongs to the mth list; and L2 score is [0,1], with larger values indicating higher risks.

For example, as shown in FIG. 4A, the value of L1 for each user is the total number of lists the user appears on with respect to the clustering anomaly list 156, the forecasting anomaly list 158, and the statistics anomaly list 160. The value of L2 for each user may be a normalized value between zero and one, with larger values indicating higher risk users (e.g., higher risk or more anomalous events involving the users).

Figure 5A:
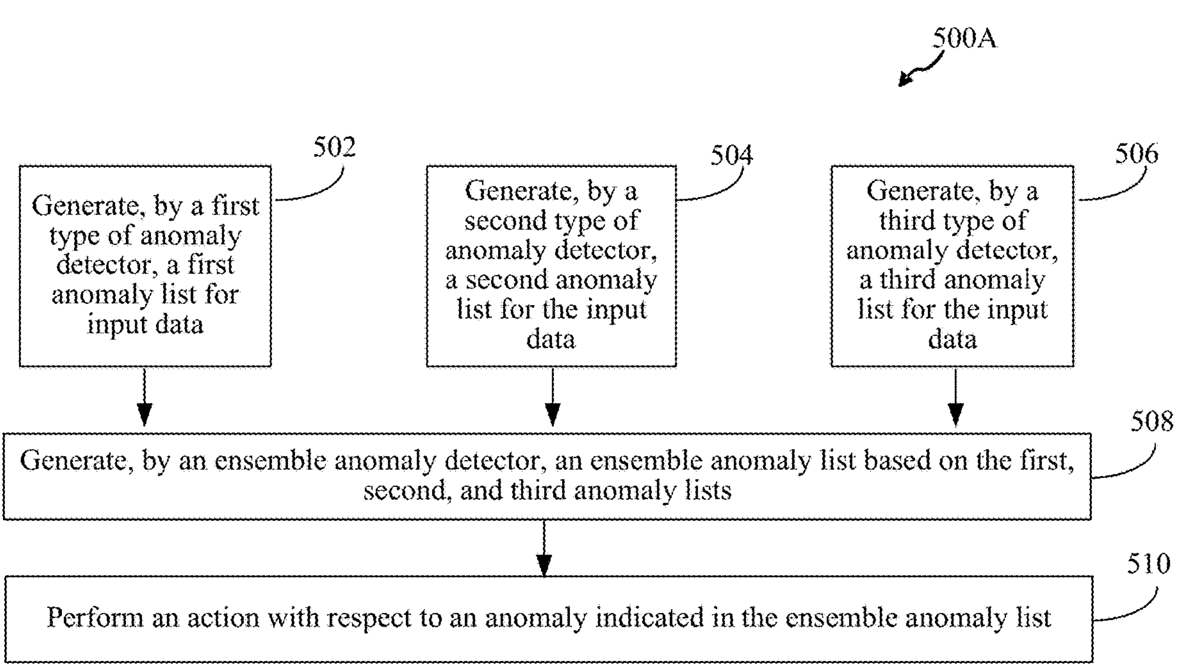
FIG. 5A shows a flowchart of a method for multi-layer anomaly detection, according to an example embodiment.

FIG. 5A shows a flowchart of a method 500A for multi-layer anomaly detection, according to an example embodiment. Embodiments disclosed herein and other embodiments may operate in accordance with example method 500A. Method 500A comprises steps 502-510. However, other embodiments may operate according to other methods. Other structural and operational embodiments will be apparent to persons skilled in the relevant art(s) based on the foregoing discussion of embodiments. No order of steps is required unless expressly indicated or inherently required, and not all steps of flowchart 500A need be implemented in all embodiments. Note that steps 502, 504, and 506 of flowchart 500A may be performed in parallel (as shown in FIG. 5A for illustrative purposes; parallel implementation may be more time and computing efficient), serial, or any combination thereof. Flowchart 500A is described as follows with reference to FIGS. 1 and 2 for ease of illustration.

As shown in FIG. 5A, in step 502, a first anomaly list for input data may be generated by a first type of anomaly detection. For example, as shown in FIGS. 1 and 2, first type anomaly detector 122 (e.g., clusterer 210) may generate first anomaly list (e.g., cluster anomaly list) 156.

In step 504, a second anomaly list for input data may be generated by a second type of anomaly detection. For example, as shown in FIGS. 1 and 2, second type anomaly detector 124 (e.g., forecaster 212) may generate second anomaly list (e.g., forecast anomaly list) 158.

In step 506, a third anomaly list for input data may be generated by a third type of anomaly detection. For example, as shown in FIGS. 1 and 2, third type anomaly detector 126 (e.g., statistics generator 214) may generate third anomaly list (e.g., statistics anomaly list) 160.

In step 508, an ensemble anomaly list may be generated based on the first, second, and third anomaly lists. For example, as shown in FIGS. 1 and 2, ensemble anomaly detector 128 may generate ensemble anomaly list 162.

In step 510, an action may be performed with respect to an anomaly indicated in the ensemble anomaly list. For example, as shown in FIGS. 1 and 2, alerter 130 may generate alert(s) 164 based on one or more anomalies indicated in ensemble anomaly list 162.

Figure 5B:
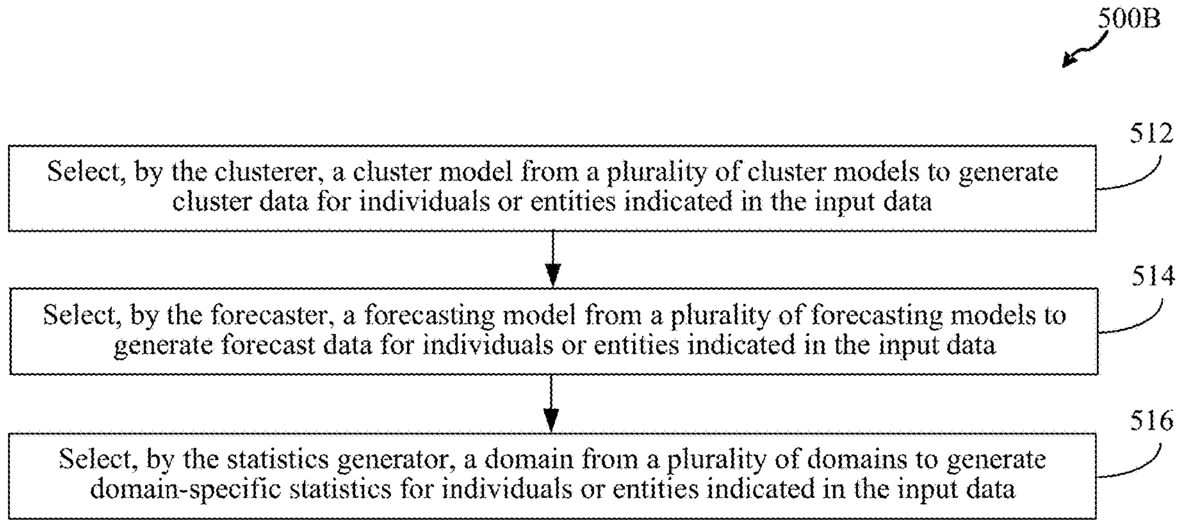
FIG. 5B shows a flowchart of a method for multi-layer anomaly detection with variable models and/or domains, according to an example embodiment.

As described above, clustering, forecasting, and/or statistics generation may be used to generate an ensemble anomaly list. For instance, FIG. 5B shows a flowchart of a method 500B for multi-layer anomaly detection with variable models and/or domains, according to an example embodiment. Embodiments disclosed herein and other embodiments may operate in accordance with example method 500B. Method 500B comprises steps 512-516. However, other embodiments may operate according to other methods. Other structural and operational embodiments will be apparent to persons skilled in the relevant art(s) based on the foregoing discussion of embodiments. No order of steps is required unless expressly indicated or inherently required, and not all steps of flowchart 500B need be implemented in all embodiments. Note that steps 512, 514, and 516 of flowchart 500B may be performed in parallel, serial (as shown in FIG. 5B merely for illustrative purposes), or any combination thereof. Flowchart 500B is described as follows with reference to FIG. 2 for ease of illustration.

As shown in FIG. 5B, in step 512, the clusterer may select a cluster model from a plurality of cluster models to generate cluster data for individuals or entities indicated in the input data. For example, as shown in FIG. 2, cluster model selector 216 in clusterer 210 may select a cluster model from a plurality of cluster models to generate cluster data for individuals or entities indicated in security data 134.

In step 514, the forecaster may select a forecasting model from a plurality of forecasting models to generate forecast data for individuals or entities indicated in the input data. For example, as shown in FIG. 2, forecast model selector 218 in forecaster 212 may select a forecast model from a plurality of forecast models to generate forecast data for individuals or entities indicated in security data 134.

In step 516, the statistics generator may select a domain from a plurality of domains to generate domain-specific statistics for the selected domain. For example, as shown in FIG. 2, domain selector 220 in statistics generator 214 may select a domain from a plurality of domains to generate domain-specific statistics for individuals or entities indicated in security data 134.

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code (program instructions) configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
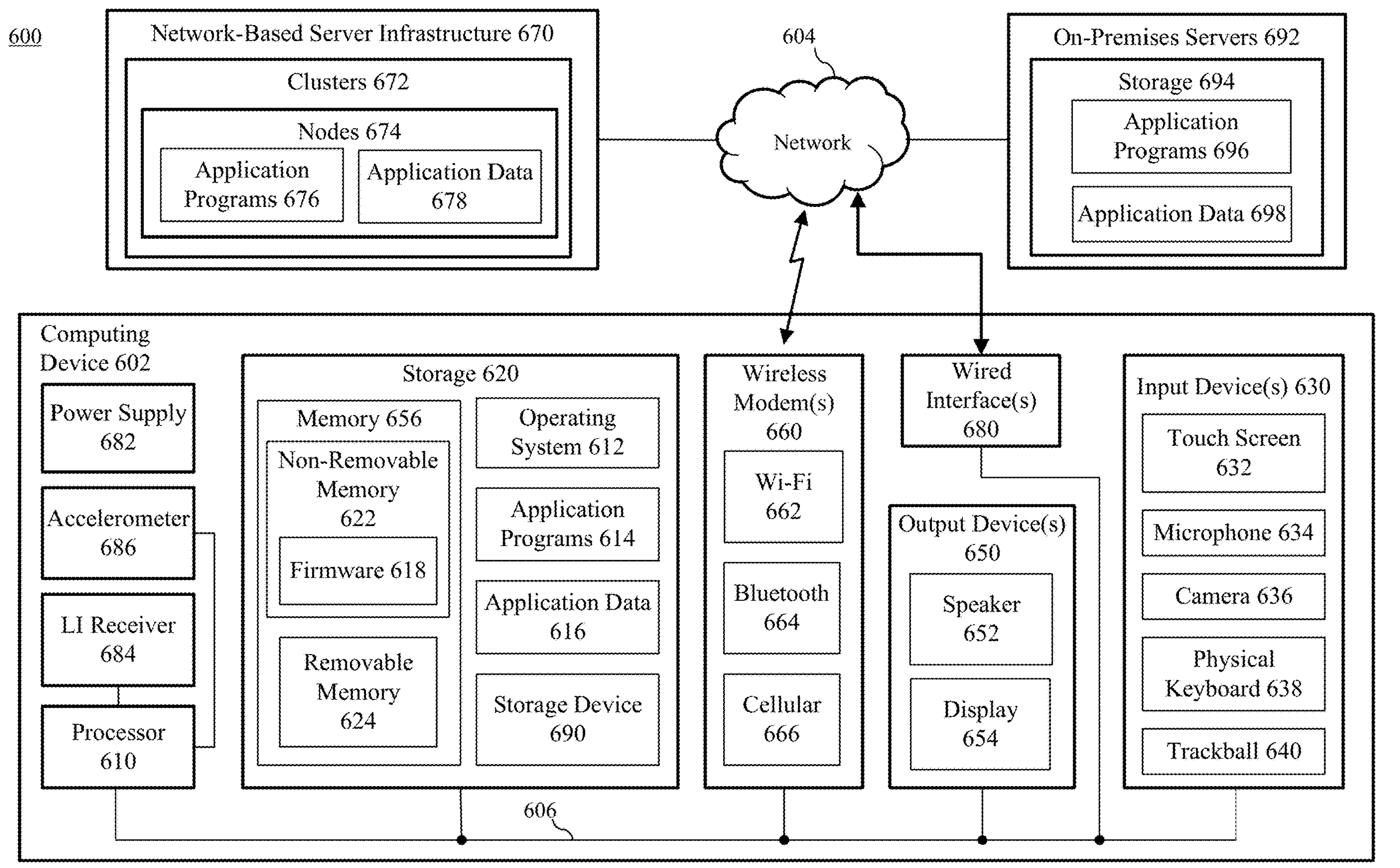
FIG. 6 shows a block diagram of an example computing device that may be used to implement embodiments.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 6. FIG. 6 shows a block diagram of an exemplary computing environment 600 that includes a computing device 602. Computing device 602 is an example of computing systems applicable to the disclosed embodiments, including computing systems that may be used to implement user devices 106, administrative servers 104, application servers 108, analyst device 112, and/or security servers 114, each of which may include any one or more of the components of computing device 602. In some embodiments, computing device 602 is communicatively coupled with devices (not shown in FIG. 6) external to computing environment 600 via network 604. Network 604 comprises one or more networks such as local area networks (LANs), wide area networks (WANs), enterprise networks, the Internet, etc., and may include one or more wired and/or wireless portions. Network 604 may additionally or alternatively include a cellular network for cellular communications. Computing device 602 is described in detail as follows.

Computing device 602 can be any of a variety of types of computing devices. For example, computing device 602 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 602 may alternatively be a stationary computing device such as a desktop computer, a personal computer (PC), a stationary server device, a minicomputer, a mainframe, a supercomputer, etc.

As shown in FIG. 6, computing device 602 includes a variety of hardware and software components, including a processor 610, a storage 620, one or more input devices 630, one or more output devices 650, one or more wireless modems 660, one or more wired interfaces 680, a power supply 682, a location information (LI) receiver 684, and an accelerometer 686. Storage 620 includes memory 656, which includes non-removable memory 622 and removable memory 624, and a storage device 690. Storage 620 also stores an operating system 612, application programs 614, and application data 616. Wireless modem(s) 660 include a Wi-Fi modem 662, a Bluetooth modem 664, and a cellular modem 666. Output device(s) 650 includes a speaker 652 and a display 654. Input device(s) 630 includes a touch screen 632, a microphone 634, a camera 636, a physical keyboard 638, and a trackball 640. Not all components of computing device 602 shown in FIG. 6 are present in all embodiments, additional components not shown may be present, and any combination of the components may be present in a particular embodiment. These components of computing device 602 are described as follows.

A single processor 610 (e.g., central processing unit (CPU), microcontroller, a microprocessor, signal processor, ASIC (application specific integrated circuit), and/or other physical hardware processor circuit) or multiple processors 610 may be present in computing device 602 for performing such tasks as program execution, signal coding, data processing, input/output processing, power control, and/or other functions. Processor 610 may be a single-core or multi-core processor, and each processor core may be single-threaded or multithreaded (to provide multiple threads of execution concurrently). Processor 610 is configured to execute program code stored in a computer readable medium, such as program code of operating system 612 and application programs 614 stored in storage 620. The program code is structured to cause processor 610 to perform operations, including the processes/methods disclosed herein. Operating system 612 controls the allocation and usage of the components of computing device 602 and provides support for one or more application programs 614 (also referred to as "applications" or "apps"). Application programs 614 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. Processor(s) 610 may include one or more general processors (e.g., CPUs) configured with or coupled to one or more hardware accelerators, such as one or more NPUs and/or one or more GPUs.

Any component in computing device 602 can communicate with any other component according to function, although not all connections are shown for ease of illustration. For instance, as shown in FIG. 6, bus 606 is a multiple signal line communication medium (e.g., conductive traces in silicon, metal traces along a motherboard, wires, etc.) that may be present to communicatively couple processor 610 to various other components of computing device 602, although in other embodiments, an alternative bus, further buses, and/or one or more individual signal lines may be present to communicatively couple components. Bus 606 represents one or more of any of several types of bus structures, including a memory bus or memory controller, a peripheral bus, an accelerated graphics port, and a processor or local bus using any of a variety of bus architectures.

Storage 620 is physical storage that includes one or both of memory 656 and storage device 690, which store operating system 612, application programs 614, and application data 616 according to any distribution. Non-removable memory 622 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 622 may include main memory and may be separate from or fabricated in a same integrated circuit as processor 610. As shown in FIG. 6, non-removable memory 622 stores firmware 618, which may be present to provide low-level control of hardware. Examples of firmware 618 include BIOS (Basic Input/Output System, such as on personal computers) and boot firmware (e.g., on smart phones). Removable memory 624 may be inserted into a receptacle of or otherwise coupled to computing device 602 and can be removed by a user from computing device 602. Removable memory 624 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 690 may be present that are internal and/or external to a housing of computing device 602 and may or may not be removable. Examples of storage device 690 include a hard disk drive, a SSD, a thumb drive (e.g., a USB (Universal Serial Bus) flash drive), or other physical storage device.

One or more programs may be stored in storage 620. Such programs include operating system 612, one or more application programs 614, and other program modules and program data. Examples of such application programs may include, for example, computer program logic (e.g., computer program code/instructions) for implementing one or more data preprocessor 118, feature generator 120, first type anomaly detector 122, second type anomaly detector 124, third type anomaly detector 126, ensemble anomaly detector 128, alerter 130, clusterer 210, cluster model selector 216, forecaster 212, forecast model selector 218, statistics generator 214, and/or domain selector 220, as well as the flowcharts/flow diagrams (e.g., flowcharts 500A and/or 500B) described herein, including portions thereof, and/or further examples described herein.

Storage 620 also stores data used and/or generated by operating system 612 and application programs 614 as application data 616. Examples of application data 616 include web pages, text, images, tables, sound files, video data, and other data, which may also be sent to and/or received from one or more network servers or other devices via one or more wired or wireless networks. Storage 620 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 602 through one or more input devices 630 and may receive information from computing device 602 through one or more output devices 650. Input device(s) 630 may include one or more of touch screen 632, microphone 634, camera 636, physical keyboard 638 and/or trackball 640 and output device(s) 650 may include one or more of speaker 652 and display 654. Each of input device(s) 630 and output device(s) 650 may be integral to computing device 602 (e.g., built into a housing of computing device 602) or external to computing device 602 (e.g., communicatively coupled wired or wirelessly to computing device 602 via wired interface(s) 680 and/or wireless modem(s) 660). Further input devices 630 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 654 may display information, as well as operating as touch screen 632 by receiving user commands and/or other information (e.g., by touch, finger gestures, virtual keyboard, etc.) as a user interface. Any number of each type of input device(s) 630 and output device(s) 650 may be present, including multiple microphones 634, multiple cameras 636, multiple speakers 652, and/or multiple displays 654.

One or more wireless modems 660 can be coupled to antenna(s) (not shown) of computing device 602 and can support two-way communications between processor 610 and devices external to computing device 602 through network 604, as would be understood to persons skilled in the relevant art(s). Wireless modem 660 is shown generically and can include a cellular modem 666 for communicating with one or more cellular networks, such as a GSM network for data and voice communications within a single cellular network, between cellular networks, or between the mobile device and a public switched telephone network (PSTN). Wireless modem 660 may also or alternatively include other radio-based modem types, such as a Bluetooth modem 664 (also referred to as a "Bluetooth device") and/or Wi-Fi modem 662 (also referred to as an "wireless adaptor"). Wi-Fi modem 662 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 664 is configured to communicate with another Bluetooth-capable device according to the Bluetooth short-range wireless technology standard(s) such as IEEE 802.15.1 and/or managed by the Bluetooth Special Interest Group (SIG).

Computing device 602 can further include power supply 682, LI receiver 684, accelerometer 686, and/or one or more wired interfaces 680. Example wired interfaces 680 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 680 of computing device 602 provide for wired connections between computing device 602 and network 604, or between computing device 602 and one or more devices/peripherals when such devices/peripherals are external to computing device 602 (e.g., a pointing device, display 654, speaker 652, camera 636, physical keyboard 638, etc.). Power supply 682 is configured to supply power to each of the components of computing device 602 and may receive power from a battery internal to computing device 602, and/or from a power cord plugged into a power port of computing device 602 (e.g., a USB port, an A/C power port). LI receiver 684 may be used for location determination of computing device 602 and may include a satellite navigation receiver such as a Global Positioning System (GPS) receiver or may include other type of location determiner configured to determine location of computing device 602 based on received information (e.g., using cell tower triangulation, etc.). Accelerometer 686 may be present to determine an orientation of computing device 602.

Note that the illustrated components of computing device 602 are not required or all-inclusive, and fewer or greater numbers of components may be present as would be recognized by one skilled in the art. For example, computing device 602 may also include one or more of a gyroscope, barometer, proximity sensor, ambient light sensor, digital compass, etc. Processor 610 and memory 656 may be co-located in a same semiconductor device package, such as being included together in an integrated circuit chip, FPGA, or system-on-chip (SOC), optionally along with further components of computing device 602.

In embodiments, computing device 602 is configured to implement any of the above-described features of flowcharts herein. Computer program logic for performing any of the operations, steps, and/or functions described herein may be stored in storage 620 and executed by processor 610.

In some embodiments, server infrastructure 670 may be present in computing environment 600 and may be communicatively coupled with computing device 602 via network 604. Server infrastructure 670, when present, may be a network-accessible server set (e.g., a cloud-based environment or platform). As shown in FIG. 6, server infrastructure 670 includes clusters 672. Each of clusters 672 includes a group of one or more compute nodes and/or a group of one or more storage nodes. For example, as shown in FIG. 6, cluster 672 includes nodes 674. Each of nodes 674 are accessible via network 604 (e.g., in a "cloud-based" embodiment) to build, deploy, and manage applications and services. Any of nodes 674 may be a storage node that comprises a plurality of physical storage disks, SSDs, and/or other physical storage devices that are accessible via network 604 and are configured to store data associated with the applications and services managed by nodes 674. For example, as shown in FIG. 6, nodes 674 may store application data 678.

Each of nodes 674 may, as a compute node, comprise one or more server computers, server systems, and/or computing devices. For instance, a node 674 may include one or more of the components of computing device 602 disclosed herein. Each of nodes 674 may be configured to execute one or more software applications (or "applications") and/or services and/or manage hardware resources (e.g., processors, memory, etc.), which may be utilized by users (e.g., customers) of the network-accessible server set. For example, as shown in FIG. 6, nodes 674 may operate application programs 676. In an implementation, a node of nodes 674 may operate or comprise one or more virtual machines, with each virtual machine emulating a system architecture (e.g., an operating system), in an isolated manner, upon which applications such as application programs 676 may be executed.

In an embodiment, one or more of clusters 672 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 672 may be a datacenter in a distributed collection of datacenters. In embodiments, exemplary computing environment 600 comprises part of a cloud-based platform such as Amazon Web Services® of Amazon Web Services, Inc., or Google Cloud Platform™ of Google LLC, although these are only examples and are not intended to be limiting.

In an embodiment, computing device 602 may access application programs 676 for execution in any manner, such as by a client application and/or a browser at computing device 602. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 602 may additionally and/or alternatively synchronize copies of application programs 614 and/or application data 616 to be stored at network-based server infrastructure 670 as application programs 676 and/or application data 678. For instance, operating system 612 and/or application programs 614 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 620 at network-based server infrastructure 670.

In some embodiments, on-premises servers 692 may be present in computing environment 600 and may be communicatively coupled with computing device 602 via network 604. On-premises servers 692, when present, are hosted within an organization's infrastructure and, in many cases, physically onsite of a facility of that organization. On-premises servers 692 are controlled, administered, and maintained by IT (Information Technology) personnel of the organization or an IT partner to the organization. Application data 698 may be shared by on-premises servers 692 between computing devices of the organization, including computing device 602 (when part of an organization) through a local network of the organization, and/or through further networks accessible to the organization (including the Internet). Furthermore, on-premises servers 692 may serve applications such as application programs 696 to the computing devices of the organization, including computing device 602. Accordingly, on-premises servers 692 may include storage 694 (which includes one or more physical storage devices such as storage disks and/or SSDs) for storage of application programs 696 and application data 698 and may include one or more processors for execution of application programs 696. Still further, computing device 602 may be configured to synchronize copies of application programs 614 and/or application data 616 for backup storage at on-premises servers 692 as application programs 696 and/or application data 698.

Embodiments described herein may be implemented in one or more of computing device 602, network-based server infrastructure 670, and on-premises servers 692. For example, in some embodiments, computing device 602 may be used to implement systems, clients, or devices, or components/subcomponents thereof, disclosed elsewhere herein. In other embodiments, a combination of computing device 602, network-based server infrastructure 670, and/or on-premises servers 692 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 620. Such computer-readable media and/or storage media are distinguished from and non-overlapping with communication media and propagating signals (do not include communication media and propagating signals).

Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 614) may be stored in storage 620. Such computer programs may also be received via wired interface(s) 680 and/or wireless modem(s) 660 over network 604. Such computer programs, when executed or loaded by an application, enable computing device 602 to implement features of embodiments discussed herein. Accordingly, such computer programs represent controllers of the computing device 602.

Embodiments are also directed to computer program products comprising computer code or instructions stored on any computer-readable medium or computer-readable storage medium. Such computer program products include the physical storage of storage 620 as well as further physical storage types.

IV. Additional Example Embodiments

Systems, methods, and instrumentalities are described herein related to multi-layer anomaly detection, which may quickly identify and issue alerts to focus limited automated and/or manpower resources on the most concerning activities detected in voluminous data. A multi-layer anomaly detector may include a first type anomaly detector (e.g., a clusterer) configured to generate a first anomaly list for input data indicating voluminous events; a second type anomaly detector (e.g., a forecaster) configured to generate a second anomaly list for the input data; a third type anomaly detector (e.g., a statistics generator) configured to generate a third anomaly list for the input data; and an ensemble detector configured to generate an ensemble anomaly list indicating a subset of events based on the first, second, and third anomaly lists. The first, second, third, and ensemble anomaly lists may indicate anomaly (e.g., security risk) scores. The ensemble anomaly list may combine the anomaly (e.g., risk) scores in the first, second, and third anomaly lists. An identifier may generate an alert for the subset of events indicated by the ensemble anomaly list from the voluminous events indicated by the input data. The alert(s) may indicate relative security risk scores for individuals, entities, and/or events. The input data may indicate behavior of individuals or entities relative to one or more types of activities, such as access to computing devices; access to real estate; or financial transactions. The multi-layer anomaly detector system includes an anomaly detection as a service for a plurality of domains. A clusterer may be implemented by a self-organizing map (SOM) neural network model. A forecaster may select a forecasting model from a plurality of forecasting models to generate forecast data for individuals or entities indicated in the input data. A statistics generator may generate domain-specific statistics, e.g., indicative of security risk.

In examples, a multi-layer anomaly detector system includes one or more processors; and one or more memory devices that store program code configured to be executed by the one or more processors. The program code includes a first type anomaly detector configured to generate a first anomaly list for input data; a second type anomaly detector configured to generate a second anomaly list for the input data; a third type anomaly detector configured to generate a third anomaly list for the input data, the first, the second, and the third type anomaly detectors being different anomaly detector types; an ensemble detector configured to generate an ensemble anomaly list based on the first, second, and third anomaly lists; and an alerter configured to generate one or more alerts for a subset of events indicated by the ensemble anomaly list from voluminous events indicated by the input data.

In examples, the input data may indicate behavior of individuals or entities.

In examples, the input data may indicate at least one of the following behaviors of individuals or entities: access to computing devices; access to real estate; or financial transactions.

In examples, the first type anomaly detector may comprise a clusterer; wherein the second type anomaly detector includes a forecaster; and wherein the third type anomaly detector includes a statistics generator.

In examples, the clusterer includes a self-organizing map (SOM) neural network model.

In examples, the forecaster may be configured to select a forecasting model from a plurality of forecasting models to generate forecast data for individuals or entities indicated in the input data.

In examples, the statistics generator may generate domain-specific statistics, e.g., indicative of security risk.

In examples, the first, second, third, and ensemble anomaly lists may indicate anomaly (e.g., security risk) scores.

In examples, the ensemble anomaly list may combine the anomaly (e.g., risk) scores in the first, second, and third anomaly lists.

In examples, the multi-layer anomaly detector system includes anomaly detection as a service for a plurality of domains.

In examples, a computer-implemented method of anomaly detection includes: generating, by a first type anomaly detector, a first anomaly list for input data; generating, by a second type anomaly detector, a second anomaly list for the input data; generating, by a third type anomaly detector, a third anomaly list for the input data, the first, the second, and the third type anomaly detectors being different anomaly detector types; generating, by an ensemble anomaly detector, an ensemble anomaly list based on the first, second, and third anomaly lists; and performing an action with respect to an anomaly indicated in the ensemble anomaly list.

In examples, the input data may indicate behavior of individuals or entities.

In examples, the input data may indicate at least one of the following behaviors of individuals or entities: access to computing devices; access to real estate; or requested or performed financial transactions.

In examples, the first type anomaly detector may comprise a clusterer; the second type anomaly detector may comprise a forecaster; and the third type anomaly detector may comprise a statistics generator.

In examples, the method may further comprise selecting, by the clusterer, a cluster model from a plurality of cluster models to generate cluster data for individuals or entities indicated in the input data.

In examples, the method may further comprise selecting, by the forecaster, a forecasting model from a plurality of forecasting models to generate forecast data for individuals or entities indicated in the input data.

In examples, the method may, e.g., further, comprise selecting, by the statistics generator, a domain from a plurality of domains to generate domain-specific statistics (e.g., indicative of security risk) for individuals or entities indicated in the input data.

In examples, the first, second, third, and ensemble anomaly lists may indicate anomaly (e.g., security risk) scores.

In examples, the ensemble anomaly list may combine the anomaly (e.g., risk) scores in the first, second, and third anomaly lists.

In examples, the multi-layer anomaly detector system may comprise anomaly detection as a service for a plurality of domains.

In examples, a computer-readable storage medium may comprise program instructions recorded thereon that, when executed by a processing circuit, perform a method comprising: generating, by a first type anomaly detector, a first anomaly list for input data; generating, by a second type anomaly detector, a second anomaly list for the input data; generating, by a third type anomaly detector, a third anomaly list for the input data; generating, by an ensemble anomaly detector, an ensemble anomaly list based on the first, second, and third anomaly lists; and performing an action with respect to an anomaly indicated in the ensemble anomaly list.

V. Conclusion

While various examples have been described above, it should be understood that they have been presented by way of example only, and not limitation. It will be understood by those skilled in the relevant art(s) that various changes in form and details may be made therein without departing from the spirit and scope of the present subject matter as defined in the appended claims. Accordingly, the breadth and scope of the present subject matter should not be limited by any of the above-described examples, but should be defined only in accordance with the following claims and their equivalents.

What is claimed is:

1. A multi-layer anomaly detector system comprising:

a processor; and a memory device that stores program code configured to be executed by the processor, the program code comprising:

a first type anomaly detector configured to generate a first anomaly list based on input data, the first anomaly list comprising at least one first type anomaly risk;

a second type anomaly detector configured to generate a second anomaly list based on the input data, the second anomaly list comprising at least one second type anomaly risk;

a third type anomaly detector configured to generate a third anomaly list based on the input data, the third anomaly list comprising at least one third type anomaly risk, the first, the second, and the third type anomaly detectors being different anomaly detector types;

an ensemble detector configured to generate an ensemble anomaly list based on the first, second, and third anomaly lists, the ensemble anomaly list classifying a non-overlapping anomaly risk appearing in one list of the first, second, or third anomaly lists as low risk, an overlapping anomaly risk appearing in two lists of the first, second, or third anomaly lists as medium risk, and an overlapping anomaly list appearing in all three of the first, second, and third anomaly lists as high risk; and a remediator configured to perform a remedial action that resolves at least one of the first type anomaly risk, the second type anomaly risk, or the third type anomaly risk.

2. The multi-layer anomaly detector system of claim 1, wherein the input data indicates behavior of at least one of individuals or entities.

3. The multi-layer anomaly detector system of claim 2, wherein the input data indicates at least one of the following behaviors of the at least one of individuals or entities:

accesses to computing devices;

accesses to real estate; or financial transactions.

4. The multi-layer anomaly detector system of claim 1, wherein the first type anomaly detector comprises a clusterer;

wherein the second type anomaly detector comprises a forecaster; and wherein the third type anomaly detector comprises a statistics generator.

5. The multi-layer anomaly detector system of claim 4, wherein the clusterer comprises a self-organizing map (SOM) neural network model.

6. The multi-layer anomaly detector system of claim 4, wherein the forecaster is configured to select a forecasting model from a plurality of forecasting models to generate forecast data for individuals or entities indicated in the input data.

7. The multi-layer anomaly detector system of claim 4, wherein the statistics generator is configured to generate domain-specific statistics.

8. The multi-layer anomaly detector system of claim 1, wherein the ensemble anomaly list further indicates a second anomaly score that combines anomaly scores indicated by at least one of the first, second, and third anomaly lists.

9. The multi-layer anomaly detector system of claim 1, wherein the multi-layer anomaly detector system comprises anomaly detection as a service for a plurality of domains.

10. A computer-implemented method of anomaly detection comprising:

generating, by a first type anomaly detector, a first anomaly list based on input data, the first anomaly list comprising at least one first type anomaly risk;

generating, by a second type anomaly detector, a second anomaly list based on the input data, the second anomaly list comprising at least one second type anomaly risk;

generating, by a third type anomaly detector, a third anomaly list based on the input data, the third anomaly list comprising at least one third type anomaly risk, the first, the second, and the third type anomaly detectors being different anomaly detector types;

generating, by an ensemble anomaly detector, an ensemble anomaly list classifying a non-overlapping anomaly risk appearing in one list of the first, second, or third anomaly lists as low risk, an overlapping anomaly risk appearing in two lists of the first, second, or third anomaly lists as medium risk, and an overlapping anomaly list appearing in all three of the first, second, and third anomaly lists as high risk; and performing a remedial action that resolves at least one of the first type anomaly risk, the second type anomaly risk, or the third type anomaly risk.

11. The computer-implemented method of anomaly detection of claim 10, wherein the input data indicates behavior of at least one of individuals or entities.

12. The computer-implemented method of anomaly detection of claim 11, wherein the input data indicates at least one of the following behaviors of the at least one of individuals or entities:

accesses to computing devices;

accesses to real estate; or at least one of requested financial transactions or performed financial transactions.

13. The computer-implemented method of anomaly detection of claim 10, wherein the first type anomaly detector comprises a clusterer;

wherein the second type anomaly detector comprises a forecaster; and wherein the third type anomaly detector comprises a statistics generator.

14. The computer-implemented method of anomaly detection of claim 13, further comprising:

selecting, by the clusterer, a cluster model from a plurality of cluster models to generate cluster data for at least one of individuals or entities indicated in the input data.

15. The computer-implemented method of anomaly detection of claim 13, further comprising:

selecting, by the forecaster, a forecasting model from a plurality of forecasting models to generate forecast data for at least one of individuals or entities indicated in the input data.

16. The computer-implemented method of anomaly detection of claim 13, further comprising:

selecting, by the statistics generator, a domain from a plurality of domains to generate domain-specific statistics for at least one of individuals or entities indicated in the input data.

17. The computer-implemented method of anomaly detection of claim 10, wherein the ensemble anomaly list further indicates a second anomaly score that combines anomaly scores indicated by at least one of the first, second, and third anomaly lists.

18. The computer-implemented method of anomaly detection of claim 10, wherein the multi-layer anomaly detector system comprises anomaly detection as a service for a plurality of domains.

19. A memory device that stores program code configured to be executed by a processor, the program code comprising:

a first type anomaly detector configured to generate a first anomaly list based on input data, the first anomaly list comprising at least one first type anomaly risk;

a second type anomaly detector configured to generate a second anomaly list based on the input data, the second anomaly list comprising at least one second type anomaly risk;

a third type anomaly detector configured to generate a third anomaly list based on the input data, the third anomaly list comprising at least one third type anomaly risk, the first, the second, and the third type anomaly detectors being different anomaly detector types;

an ensemble detector configured to generate an ensemble anomaly list based on the first, second, and third anomaly lists, the ensemble anomaly list classifying a non-overlapping anomaly risk appearing in one list of the first, second, or third anomaly lists as low risk, an overlapping anomaly risk appearing in two lists of the first, second, or third anomaly lists as medium risk, and an overlapping anomaly list appearing in all three of the first, second, and third anomaly lists as high risk; and a remediator configured to perform a remedial action that resolves at least one of the first type anomaly risk, the second type anomaly, or the third type anomaly risk.

20. The memory device of claim 19, wherein the first type anomaly detector comprises a clusterer comprising a self-organizing map (SOM) neural network model, the second type anomaly detector comprises a forecaster configured to select a forecasting model from a plurality of forecasting models to generate forecast data for individuals or entities indicated in the input data, and the third type anomaly detector comprises a statistics generator configured to generate domain-specific statistics.

* * * * *